United States Patent
Sthanikam et al.

(10) Patent No.: US 7,627,566 B2
(45) Date of Patent: Dec. 1, 2009

(54) ENCODING INSIGNIFICANT WHITESPACE OF XML DATA

(75) Inventors: Balasubramanyam Sthanikam, Foster City, CA (US); Sivasanakan Chandrasekar, Palo Alto, CA (US); Sam Idicula, San Jose, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 359 days.

(21) Appl. No.: 11/707,730

(22) Filed: Feb. 16, 2007

(65) Prior Publication Data

US 2008/0098019 A1    Apr. 24, 2008

Related U.S. Application Data

(60) Provisional application No. 60/853,236, filed on Oct. 20, 2006.

(51) Int. Cl.
G06F 7/00 (2006.01)
G06F 17/30 (2006.01)

(52) U.S. Cl. .............. 707/4; 707/101; 707/102
(58) Field of Classification Search .......... 707/101, 707/4
See application file for complete search history.

(56) References Cited

U.S. PATENT DOCUMENTS

| | | | |
|---|---|---|---|
| 5,780,830 A * | 7/1998 | Boie et al. | 235/462.01 |
| 5,991,713 A * | 11/1999 | Unger et al. | 704/9 |
| 6,635,088 B1 | 10/2003 | Hind et al. | |
| 6,883,137 B1 | 4/2005 | Girardot et al. | |
| 6,966,029 B1 * | 11/2005 | Ahern | 715/234 |
| 7,013,424 B2 | 3/2006 | James et al. | |
| 7,013,425 B2 | 3/2006 | Kataoka | |
| 7,031,956 B1 | 4/2006 | Lee et al. | |
| 7,080,094 B2 | 7/2006 | Dapp et al. | |
| 7,143,397 B2 | 11/2006 | Imaura | |
| 7,318,194 B2 * | 1/2008 | Achilles et al. | 715/237 |
| 7,398,265 B2 * | 7/2008 | Thusoo et al. | 707/2 |
| 7,441,185 B2 * | 10/2008 | Coulson et al. | 715/234 |
| 7,496,612 B2 * | 2/2009 | Magee et al. | 707/203 |
| 7,500,017 B2 * | 3/2009 | Cseri et al. | 709/246 |

(Continued)

OTHER PUBLICATIONS

"Notification of Transmittal of the International Search Report and the Written Opinion of the International Searching Authority, or the Declaration" received from International application No. PCT/US2008/071492 mailed Nov. 26, 2008 (15 pages).

(Continued)

Primary Examiner—Kuen S Lu
Assistant Examiner—Tuan Pham
(74) Attorney, Agent, or Firm—Hickman Palermo Truong & Becker LLP

(57) ABSTRACT

Techniques are described for preserving the original insignificant white space of XML data. The techniques may be used in combination with compact XML data storage formats, such as binary XML, to preserve the insignificant white space without requiring as much storage space as uncompressed formats. White space opcodes/operand pairs are described for representing white space characters and white space patterns. The white space opcode/operand pairs represent the white space in binary XML, are use to generate the original white space when the binary XML is decoded back to textual XML data.

24 Claims, 2 Drawing Sheets

U.S. PATENT DOCUMENTS

| | | | |
|---|---|---|---|
| 2002/0038319 | A1 | 3/2002 | Yahagi |
| 2003/0041302 | A1* | 2/2003 | McDonald ................. 715/513 |
| 2004/0148278 | A1 | 7/2004 | Milo et al. |
| 2004/0267760 | A1 | 12/2004 | Brundage et al. |
| 2005/0033733 | A1 | 2/2005 | Shadmon et al. |
| 2005/0060647 | A1* | 3/2005 | Doan et al. ................. 715/514 |
| 2005/0278289 | A1 | 12/2005 | Gauweiler et al. |
| 2005/0278616 | A1* | 12/2005 | Eller ......................... 715/513 |
| 2005/0289125 | A1 | 12/2005 | Liu et al. |
| 2006/0085737 | A1* | 4/2006 | Liu ............................ 715/513 |
| 2006/0168513 | A1* | 7/2006 | Coulson et al. ............. 715/513 |
| 2006/0212467 | A1* | 9/2006 | Murthy et al. .............. 707/101 |
| 2006/0235868 | A1* | 10/2006 | Achilles et al. ............. 707/102 |
| 2007/0006078 | A1* | 1/2007 | Jewsbury et al. ........... 715/716 |
| 2008/0028296 | A1* | 1/2008 | Aharoni ...................... 715/236 |
| 2008/0098001 | A1 | 4/2008 | Gupta et al. |
| 2008/0098020 | A1 | 4/2008 | Gupta et al. |

OTHER PUBLICATIONS

"Efficient XML Interchange Measurements" XP-002503310, Working Draft Jul. 25, 2007 (142 pages).

Giradot, M. et al., "Millau: an encoding format for efficient representation and exchange of XML over the Web" XP-001005949, 2000 (20 pages).

"XML Parsing" XP-002503367 Oct. 11, 2008 (4 pages).

Bayardo et al., "Optimizing encoding: An evaluation of binary xml encoding optimizations for fast stream based xml processing", May 2004, Proceedings of the 13th international conference on World Wide Web WWW 04', Publisher ACM press, 7 pages.

Liu et al., "XML retrieval: Configurable indexing and ranking for XML information retrieval", Jul. 2004, Proceedings of the 27th annual international ACM SIGIR conference on Research and development in information retrieval SIGIR 04', Published by ACM press, 12 pages.

Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.

Min et al., "XML Indexing and compression: XPRESS: a queriable compression for XML data", Jun. 2003, Proceedings of the 2003 ACM SIGMOD international conference on Management of data SIGMOD 03', Published by ACM Press, 8 pages.

Zou et al., "XML Processing: Ctree: a compact tree for indexing XML data" Nov. 2004, Proceedings of the 6th annual international workshop on Web information and data management WIDM 04', Published by ACM Press, 10 pages.

U.S. Appl. No. 12/180,760, filed Jul. 28, 2008, Notice of Publication, Apr. 30, 2009.

U.S. Appl. No. 11/601,118, filed Nov. 16, 2008, Office Action, Mar. 16, 2009.

U.S. Appl. No. 11/601,118, filed Nov. 16, 2008, Office Action, May 22, 2009.

* cited by examiner

ENCODING INSIGNIFICANT WHITESPACE OF XML DATA

RELATED APPLICATION

This application is related to and claims the benefit of priority from provisional Application No. 60/853,236 filed Oct. 20, 2006, entitled "HANDLING BINARY XML"; the entire content of which is incorporated by this reference for all purposes as if fully disclosed herein.

FIELD OF THE INVENTION

This relates to storing XML data and, more specifically, to preserving insignificant whitespace of XML Data.

BACKGROUND

XML data typically includes numerous whitespace characters. For example, consider the following XML data (Example 1):

```
<root>
    <a>
        Text in a
    </a>
</root>
```

To make the whitespace in Example 1 more evident, Example 1 is reproduced hereafter with [sp] in the place of spaces, and [nl] in the place of new line characters:

```
<root>[nl]
[sp][sp][sp]<a>[nl]
[sp][sp][sp][sp][sp][sp][sp]Text[sp]in[sp]a[nl]
[sp][sp][sp]</a>[nl]
</root>
```

Insignificant White Space

White space characters within XML data are either significant or insignificant. Significant whitespace characters affect the semantics of the XML data. In Example 1, the spaces in the string "Text in a" are significant because the spaces are part of the value of the string. Thus, "Textina", "Text in a" and "Text in a" all have different semantic meanings.

Insignificant white space characters, on the other hand, do not affect the semantics of the XML data. In Example 1, the three spaces that precede <a> are insignificant because they have no effect on the meaning of the XML data of Example 1. Thus, XML data represented by Example 1 has the same meaning whether there are three, zero, or a thousand spaces preceding <a>.

When XML data is stored as CLOBs (Character Large Objects), all characters, including insignificant white space, are preserved. However, CLOBs are often not the most efficient way to store XML data. To be stored in more efficient storage formats, such as object relational storage formats and Binary XML storage formats, the XML data typically has to go through a conversion operation that does not preserve the insignificant white space. Such conversion processes ignore the insignificant whitespace because preserving the insignificant whitespace will typically result in wasted storage.

Binary XML

As indicated above, Binary XML is one of the formats that do not preserve the insignificant white space of XML data. Binary XML is a compact binary representation of XML that was designed to reduce the size of XML documents. One of the ways binary XML compresses data is by representing strings with fixed values.

In one implementation of binary XML, a mapping is established between character strings and replacement values, where the character strings are tag names, and the replacement values are numbers. Such mappings are referred to herein as "translation information".

For example, consider an XML document PO1 that contains the following content:

```
<Purchase Order>
    <body>
        Important Data
    </body>
</Purchase Order>
```

PO1 includes the character strings "Purchase Order" and "body". To store PO1 in binary XML format, the token "Purchase Order" may be mapped to 1, and the token "body" may be mapped to 2. Typically, the replacement values consume much less space than the corresponding tokens. For example, the token "Purchase Order", which contains fourteen characters, may be assigned a binary replacement value that takes less space to store than a single text character.

Once translation information has been created, XML documents may be stored in binary XML based on the translation information. For example, PO1 may be stored as <1><2> Important Data</2></1>. In typical implementations of binary XML, even the symbols (e.g. "<", ">", and "/") may be represented by binary replacement values.

Pretty Printing

While insignificant white space has no effect on the semantics of XML data, it does serve a purpose. In particular, it makes the XML data more readable to humans. Therefore, applications that display XML data to humans reflect the insignificant whitespace in the display. Unfortunately, if the XML data that is to be displayed is stored in a format that did not preserve original insignificant whitespace, then the application will not be able to format the display of the XML data based on the original insignificant white space.

If the XML data that is to be displayed has had its original insignificant whitespace removed, then applications typically display the XML data based on their own "pretty printing" rules. The pretty printing rules of an application may indicate, for example, that every child element is indented three spaces relative to its parent element, etc. While the insignificant white space that is added by such pretty printing rules makes the XML data much more human-readable, the resulting display of the XML data may be significantly different than what the XML data would have looked like if the original insignificant white space had been preserved.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for preserving the original insignificant white space of XML data. The techniques may be used in combination with compact XML data storage formats, such as binary XML, to preserve the insignificant white space without requiring as much storage space as uncompressed formats, such as CLOBs. Because the original insignificant white space is preserved, applications that pretty print the XML data may do so in a manner that reflects the original XML data formatting, rather than applying pretty printing rules that might result in a significantly different visual representation of the XML.

Binary XML Opcodes

Binary XML represents XML data as a stream of opcodes, where each opcode is followed by any operands required by the opcode. Appendix 1 includes a list of opcodes that may be used in one possible implementation of binary XML. However, binary XML is not limited to any particular set of opcodes.

Frequently, the operands that follow Binary XML opcodes are replacement values. When decoding Binary XML to reproduce the XML data represented by the Binary XML, replacement values are converted back into the tokens that the replacement values represent. For example, assume that the opcode for "begin element" is BE, and that the replacement value for <root> is 0x23456. In this example, the XML data element <root> would be encoded as BE 0x23456. During decoding, the BE opcode would inform the decoder that the next value in the XML data is an operand that represents the beginning of an element. The decoder would then translate the replacement value 0x23456 back into the token <root>.

White Space Opcodes

According to one embodiment, white space is perseverved by causing a binary XML encoder to insert "white space opcodes" and "white space operands" at the appropriate places within the binary XML output stream. A white space opcode is an opcode that indicates that the following value is a white space operand. A white space operand, in turn, is an operand that represents one or more insignificant white space characters.

Figure 1:
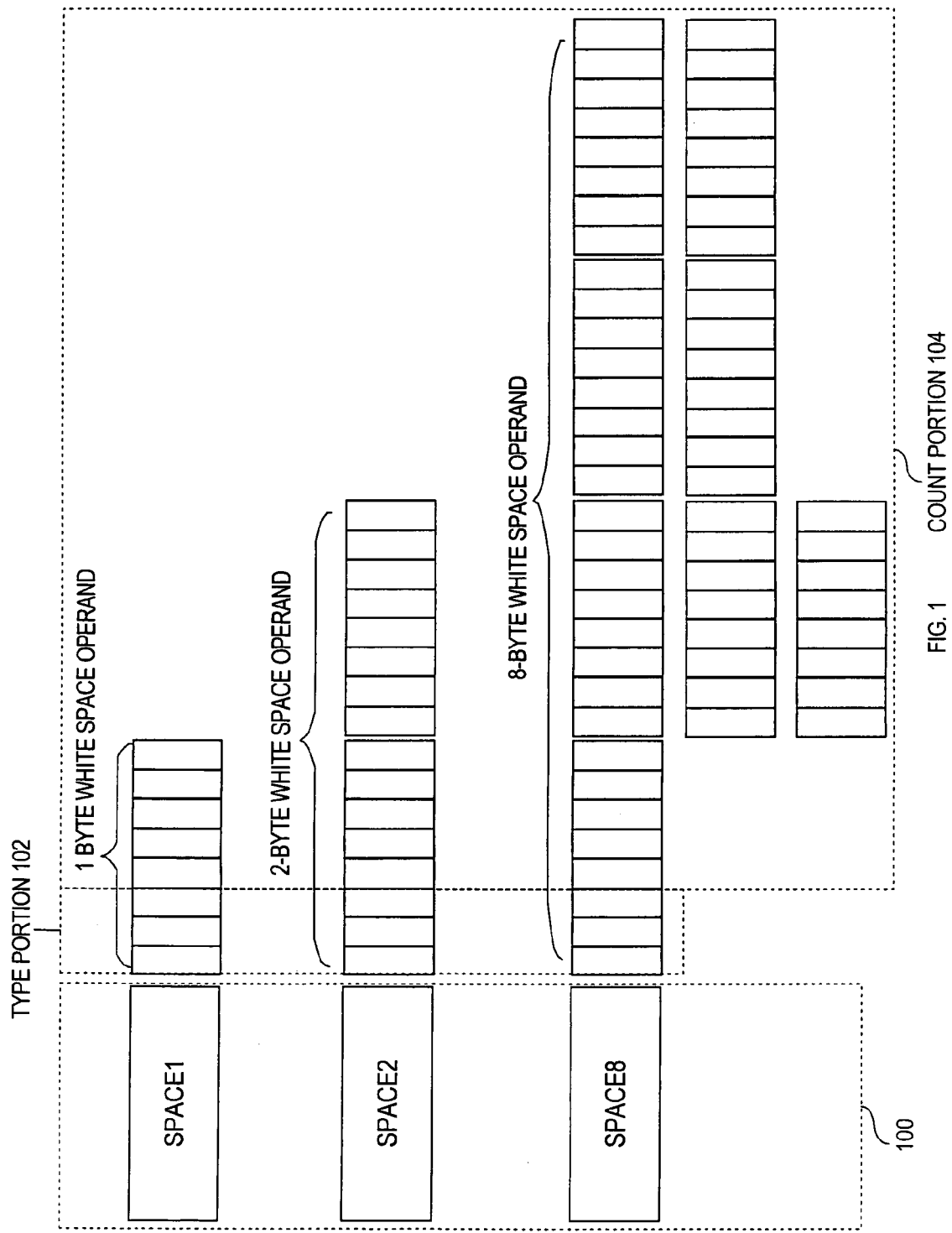
FIG. 1 is a block diagram illustrating white space opcode/operand pairs for preversing white space according to an embodiment of the invention.

According to one embodiment, three separate white space opcodes are used to encode insignificant white space. Referring to FIG. 1, the three opcodes 100 are illustrated as SPACE1, SPACE2 and SPACE8. Similar to other binary XML opcodes, the white space opcodes may actually be represented within computer memory by numerical values, such as 0x23, 0x43 and 0x59.

As illustrated in FIG. 1, the SPACE1 opcode indicates that the following byte is a white space operand. The SPACE2 opcode indicates that the following two bytes are a white space operand. The SPACE8 indicates that the following eight bytes are a white space operand.

White Space Operands

As mentioned above, a white space operand represents one or more insignificant white space characters. According to one embodiment, each white space operation has two portions: a type portion 102 and a count portion 104. The type portion 102 of a white space operand indicates the type of white space that is represented by the operand. According to one embodiment, the type portion of the operand indicates either a white space character (space, tab, new line, or carriage return) or a white space pattern.

In an embodiment illustrated in FIG. 1, the first three bits of each white space operand serve as the type portion 102 of the operand. The remaining bits of the white space operand are used as the count portion 104. Using three bits for the type portion of the white space operand allows eight possible types to be specified. According to one embodiment, the correlation between white space types and bit patterns is as follows:

| Bit Pattern | White Space Type |
| --- | --- |
| 000 | space character |
| 001 | tab character |
| 010 | new line character |
| 011 | carriage return character |
| 100 | pattern (one new line character followed by spaces) |
| 101 | pattern (e.g. one tab followed by spaces) |
| 110 | pattern (e.g. spaces followed by one tab) |
| 111 | pattern (e.g. new line followed by carriage return) |

The count portion of a white space operand indicates the number of occurrences of (1) the white space character, (2) the white space pattern, or (3) a portion of the white space pattern. For example, when the type portion holds the value 000 indicating that the operand represents space characters, the count portion of the operand stores the number of spaces that are represented by the white space operand. As another example, when the type portion holds the value 100 indicating that the operand represents a new line character followed by spaces, the operand stores the number of spaces that follow the new line character.

The embodiment that uses white space opcodes SPACE1, SPACE2 and SPACE8 selects which white space opcode to use to represent a particular occurrence of white space based on the number that needs to be represented in the count portion of the operand. Because the SPACE1 has a one byte operand, and three of the operand bits are used for the type portion, five bits are available to be used as the count portion. Five bits can represent 32 distinct values. On the other hand, SPACE2 has a two-byte operand. With three of the operand bits used for the type portion, 13 bits are available to be used as the count portion. Thirteen bits can represent 8192 distinct values. SPACE8 has an eight-byte operand. With three of the operand bits used for the type portion, 61 bits are available to be used as the count portion. Sixty-one bits can represent 2,305,843,009,213,693,952 distinct values.

It should be noted that the white space opcodes and operand formats described herein are merely examples of how white space operators and operands may be implemented. An alternative embodiment may implement a single opcode that supports only a one-byte operand. If the one-byte operand is not sufficient to represent the number of occurrences of a white space character, then one or more white space opcode/operator pairs may be inserted in series. Thus, SPACE1 00011111 SPACE1 100000011 may be used to represent thirty-six spaces in the same way that SPACE2 00000000 00100100 represents thirty-six spaces.

Further, alternative embodiments may use more than three bits for the type portion of the white space operand. The more bits that are used for the type portion, the more distinct white space patterns can be supported. Supporting more white space patterns may be beneficial because supported white space patterns may be represented in a single white space opcode/operand pair. White space patterns that do not correspond to any type portion bit pattern must be split up into multiple white space patterns that are supported by type portion bit patterns, and therefore must be represented by multiple white space opcode/operand pairs. For example, assume that the XML data includes a new line character followed by a space followed by another new line character. If the [nl][sp][nl] pattern does not have its own type portion bit pattern, then [nl][sp][nl] may be split into [nl][sp] which is associated with type portion bit pattern 100, and [nl] which is associated with type portion bit pattern 010. Thus, [nl][sp][nl] would be converted to SPACE1 10000001 SPACE1 0100000001.

In the examples given herein, the type portion is a certain specified number of bits at the beginning of the white space operand. However, in alternative embodiments, the bits used for the type portion may be at the end of the space operand, or at some other known location within the white space operand. Alternatively, bits within the white space opcode can be used to specify the type of whitespace, or different white space opcodes could be used to indicate different types of white space or white space patterns.

Decoding White Space Opcode/Operand

Similar to other opcode/operands in the binary XML output stream, the point at which a white space opcode/operand occurs in the binary XML stream corresponds to the point, within the original XML data, at which the white space that is represented by the white space opcode/operand occurred. Thus, the binary XML for:

<root>[nl]
[sp][sp][sp]<a>[nl]

would be:

[begin element opcode] [replacement value for <root>] SPACE1 10000011 [begin element opcode] [replacement value for <a>] SPACE1 01000001

When decoding this binary XML stream back into textual XML data, the binary XML decoder generates <root> in response to decoding [begin element opcode] [replacement value for <root>], generates a new line character and three spaces in response to decoding SPACE1 10000011, generates <a> in response to decoding [begin element opcode] [replacement value for <a>], and generates a new line character in response to decoding SPACE1 01000001. Thus, the original XML data, including the original insignificant white space, are reproduced during the decoding process.

When producing XML data for applications that do not require the insignificant white space, the binary XML decoder may simply ignore the white space opcodes/operands that are present in the binary XML stream. Applications that implement their own pretty printing rules may provide users that option of having XML data displayed based on the pretty printing rules, or based on the original XML data formatting. If the user selects to have the XML data displayed based on the pretty printing rules, then the binary XML decoder ignores the white space opcodes/operands, and the application inserts white space characters based on its pretty printing rules. On the other hand, if the user selects to have the XML data displayed with original formatting, the binary XML decoder generates whitespace characters based on the white space opcode/operand pairs, as described above.

White Space Preservation Flag

Even when compressed in binary XML using the techniques described herein, preserving white space takes up more storage than not preserving white space. Therefore, when it is known that preserving the original white space is not necessary, it may still be desirable to generate the binary XML stream without white space opcodes/operands. According to one embodiment, the encoder stores a flag, within the binary XML that is generated for XML data, to indicate whether the binary XML code preserves the original white space of the XML data. For example, the beginning of a binary XML stream typically includes a DOC opcode. In one embodiment, a bit within the DOC opcode is used to indicate whether white space was preserved.

When decoding binary XML, the binary XML decoder inspects the flag bit within the DOC opcode. If the bit indicates that white space was not preserved, then the decoder need not look for white space opcode/operand pairs within the binary XML. If the bit indicates that white space was preserved, then the binary XML decoder may either ignore or translate the white space opcode/operand pairs within the binary XML, depending on whether the application needs to see the original white space.

When XML data that is currently stored in binary XML is to be output (e.g. to a file, stream, or an I/O device), the process responsible for outputting the XML data may first inspect the flag to determine whether the original white space is preserved. If the flag indicates that the original white space was not preserved, then the process may insert white space according to pretty printing rules while the XML data is being decoded. On the other hand, if the flag indicates that the original white space was preserved, the process may simply turn off the pretty printing rules, and output the XML data with the original white space. By using the flag, the process is able to know, from the start of the decoding process, whether it will be necessary to insert white space based on the pretty printing rules.

Binary XML Transmission and Storage

Embodiments have been described in which insignificant white space is preserved in binary XML that is stored within a database. However, binary XML may be used in many contexts, and is not limited to being an internal database storage format. For example, binary XML can not only be stored in a database, but it can also be sent from one machine to another over network (e.g. from Database to Mid tier). In addition, binary XML may be stored in a file (outside a database) by a middle-tier component, or may be operated on in volatile memory. In all of these uses of binary XML, the techniques described herein may be used to ensure that insignificant white space is preserved for the XML data represented by the binary XML.

Hardware Overview

Figure 2:
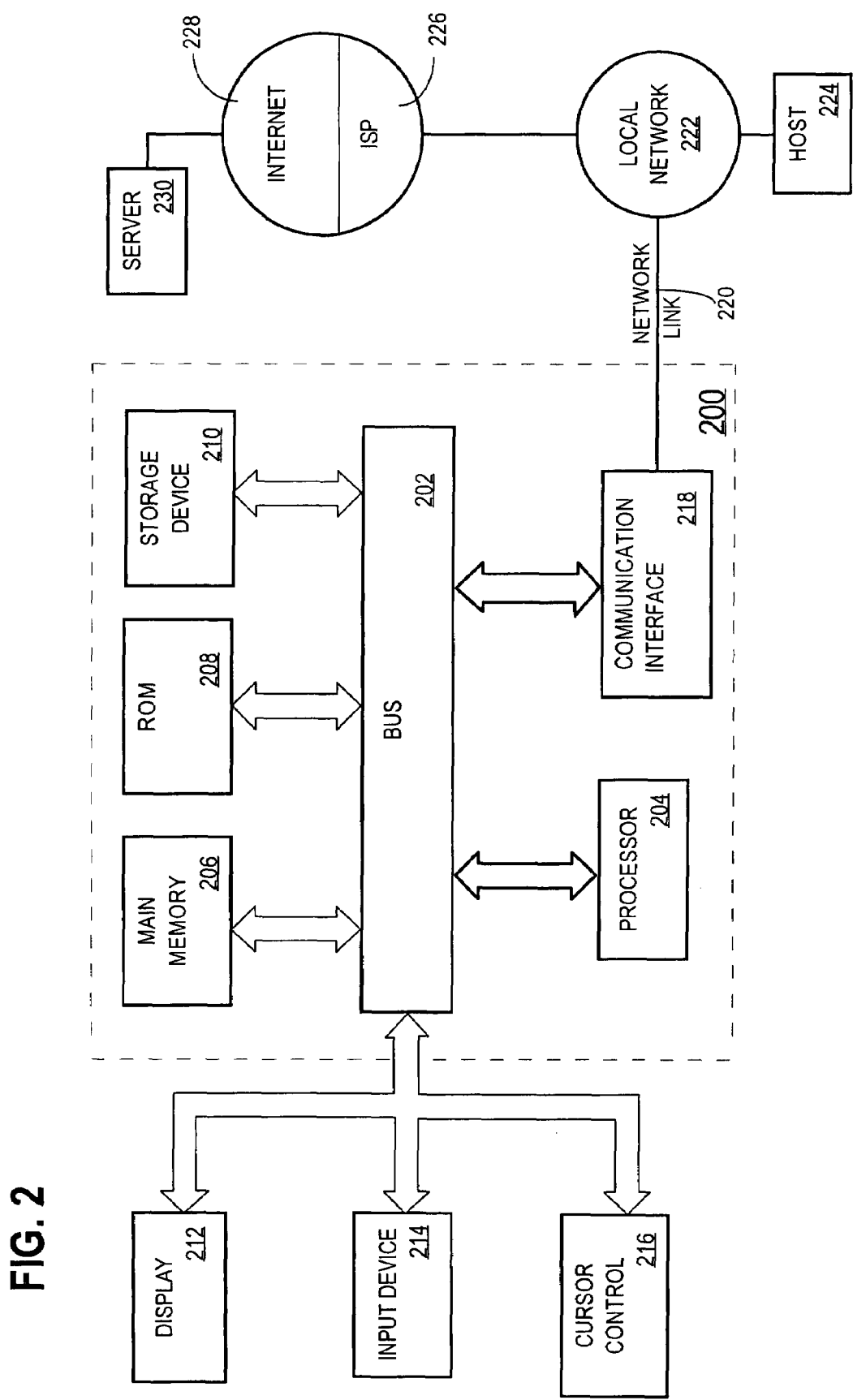
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX 1

Element Encoding

The CSX opcodes are designed to optimize both space and processing speed for the common cases. Since some of the optimized opcodes may not handle the largest possible operands and/or other options, processors can use the "generalized" opcodes in such cases. For example, there are optimized opcodes for the case of element or attribute with a single text node child. If an element contains multiple text node children and/or has interspersed comments, etc, it can be encoded using the generalized element start (PRPST*), followed by opcodes corresponding to the children and ending with the ENDPRP opcode.

Opcodes are encoded using the following scheme as a single byte. Instructions may only have a single operand of variable length, and that operand must be the last one. In this case, the length of the variable length operand itself must be the first operand.

The node data values are always accompanied by 1/2/8 byte length. The first byte of the length indicates the encoding type as shown below. The 1-byte length format is sufficient to encode all types (and their lengths) except the following string values greater than 64 bytes binary values greater than 32 bytes In these cases, the length is represented by 2/8 bytes. The actual length is calculated by masking out the two high-order bits of the first byte. The two high-order bits of the first byte indicate the encoding type as follows:

0x00—encoding type is string

0x01—encoding type is binary

0x10, 0x11—reserved for future use

Note: The opcodes listed below are identified by their mnemonic names. In actual use, these opcodes correspond to actual byte values.

1.1.1 DAT Opcodes

This set of opcodes specify the encoding type as well as the length of the data operand of the current node/item e.g. in schema/sequential mode or XQuery Data model item. There are no other operands, and there is no prefix id. These "opcodes" can also appear as the I-byte data length operand in other operations.

| Operation | Description |
| --- | --- |
| DATSTRx | Data encoded as string. Length 1-64 bytes. |
| DATBINx | Data encoded as binary. Length 1-32 bytes. |
| DATNMx | Data encoded as oranum. Length 1-21 bytes. |
| DATINT1 | Data encoded as 1 byte int. |
| DATINT2 | Data encoded as 2 byte int. |
| DATINT4 | Data encoded as 4 byte int. |
| DATINT8 | Data encoded as 8 byte int. |
| DATUINT1 | Data encoded as 1 byte unsigned-int. |
| DATUINT2 | Data encoded as 2 byte unsigned-int |
| DATUINT4 | Data encoded as 4 byte unsigned-int |
| DATUINT8 | Data encoded as 8 byte unsigned-int |
| DATFLT4 | Data encoded as 4 byte float |
| DATFLT8 | Data encoded as 8 byte float |
| DATEPH4 | Data encoded as 4 byte epoch |
| DATEPH8 | Data encoded as 8 byte epoch |
| DATEPZ6 | Data encoded as 6 byte epochTZ |
| DATEPZ10 | Data encoded as 10 byte epochTZ |
| DATODT | Data encoded as oradate |
| DATOTS | Data encoded as orats without timezone |
| DATOTSZ | Data encoded as orats with timezone |
| DATBOL | Data encoded as boolean |
| DATQNM4 | Data encoded as 4-byte token ID followed by 2-byte prefix ID |
| DATQNM8 | Data encoded as 8-byte token ID followed by 2-byte prefix ID |
| DATENM1 | Data encoded as 1 byte enum |
| DATENM2 | Data encoded as 2 byte enum |

1.1.2 General DATA Opcodes

| Operation | Description |
| --- | --- |
| DATAL2 | A two byte length operand follows indicating the length of data, followed by that many bytes of data for the current element. |
| DATAL8 | A eight byte length operand follows indicating the length of data, followed by that many bytes of data for the current element |
| DATATL1 | 1 byte data length operand, 4-byte type-id followed by data. |
| DATATL2 | 2 byte data length operand, 4-byte type-id followed by data. |
| DATATL8 | 8 byte data length operand, 4-byte type-id followed by data. |
| DATEMPT | Schema-sequential/array mode only: the data for the current element is empty (e.g. <tag/>) |
| DATNULL | Schema-sequential mode only: the current element doesn't exist in this instance. |

1.1.3 Schema Related Opcodes

| Operation | Description |
| --- | --- |
| SCHSST1 | Start schema scope. Contains a 1 byte length operand followed by a one byte version number. The third operand is a variable-length schema ID |
| SCHSST4 | Start schema scope. Contains a 1 byte length operand followed by a four byte version number. The third operand is a variable-length schema ID |
| SCHSST4V | Start schema scope with full validity assertion. Contains a 1 byte length operand followed by a four byte version number. The third operand is a variable-length schema ID. The data encoded using this schema is asserted to be fully valid (as opposed to the default partial validity). |
| SCHSEND | End of schema scope |

1.1.4 DTD Related Opcodes

| Operation | Description |
| --- | --- |
| DTDSTR | Start of doctype declaration. Operands are 2-byte length total of all operand data, followed by name, publicID and systemID strings prefixed with their individual 2-byte lengths. |
| DTDELEM | DTD Element definition. Operands are 2-byte length total of all operand data, followed by name and content spec strings prefixed with their individual 2-byte lengths. |
| DTDALIST | DTD Attribute List definition. Operands are 2-byte length total of all operand data, followed by element name and attribute definition text strings prefixed with their individual 2-byte lengths. |
| DTDENT | DTD (General) Entity definition. Operands are 2-byte length total of all operand data, followed by name, value, publicID, systemID and notation name strings prefixed with their individual 2-byte lengths. |
| DTDPENT | DTD Parameter Entity definition. Operands are 2-byte length total of all operand data, followed by name, publicID and systemID strings prefixed with their individual 2-byte lengths. |
| DTDNOT | DTD Notation definition. Operands are 2-byte length total of all operand data, followed by name, publicID and systemID strings prefixed with their individual 2-byte lengths. |
| DTDEND | End of doctype declaration. |
| ENTREF | Entity Reference. First operand is 1 byte name length followed by entity name. |
| CHARREF | Character Reference. First operand is a 1 byte length followed by variable number of bytes comprising the character reference. |

1.1.5 Document/Section Related Opcodes

| Operation | Description |
| --- | --- |
| DOC | Document node. $1^{st}$ operand is a 1 byte length of the optional charset ID-this may be 0 if not present. $2^{nd}$ operand is a 2 byte flag, as follows:<br>Bit 0 is set if standalone is declared in prolog.<br>Bit 1 is set if a prolog is present<br>Bit 2 is set if the encoding is declared in the prolog<br>Bit 3 is set if the XML version is in the image header (else version = 1.0)<br>Bit 4 is set if standalone = TRUE<br>Bit 5 is set if the document preserves ignoreable whitespace<br>Bits 8-15 are the XML version (low four bits indicate minor version), e.g. version 1.1 = 0x11. $3^{rd}$ the character set the data was originally encoded in. |
| STRTSEC | Start of section. This opcode is followed by the section header and the section data. |
| ENDSEC | End of section |
| CHUNK | Chunk instruction followed by 1 byte flag and 4 byte chunk length. Flag bits are:<br>0x01 - Chunk references a token previously defined within this section. |
| REF | Section reference. 1st operand is a one byte reference length followed by reference data |

1.1.6 Text/CDATA/PI/Comment Opcodes

| Operation | Description |
| --- | --- |
| TEXT1 | A text node with a 1 byte length operand, followed by the data |
| TEXT2 | A text node with a 2 byte length operand, followed by the data |
| TEXT8 | A text node with a 8 byte length operand, followed by the data |
| CDATA1 | A CDATA node with a 1 byte length operand, followed by the data |
| CDATA2 | A CDATA node with a 2 byte length operand, followed by the data |
| CDATA8 | A CDATA node with a 8 byte length operand, followed by the data |
| PI1L1 | Processing Instruction. Operand 1 is a 1 byte length for both target and data and operand 2 is a 1 byte length just for the target, operand 3 is the target bytes and data bytes concatenated |
| PI2L4 | Same as PI1L1 but the total length is 4 bytes and the target length is 2 |
| CMT1 | Comment. Operand 1 is a 1 byte length, and operand 2 is the value |
| CMT2 | Comment. Operand 1 is a 2 byte length, and operand 2 is the value |
| CMT8 | Comment. Operand 1 is a 8 byte length, and operand 2 is the value |

1.1.7 Token Definition Opcodes

| Operation | Description |
|---|---|
| DEFNM4L1 | Define a namespace URL token. The first operand is the 1-byte URL length, the second operand is a 4-byte namespace token ID, and the third Operand is the namespace URL. |
| DEFNM4L2 | Same as DEFNM4L1 except with 2-byte URL length. |
| DEFNM8L1 | Same as DEFNM4L1 except with 8 byte namespace token ID. |
| DEFNM8L2 | Same as DEFNM4L1 except with 2-byte URL length and 8-byte namespace token ID. |
| DEFPFX1 | Define a prefix, with the first operand being a one byte prefix length, the second operand being a 4 byte namespace token ID, the third operand a two byte prefix ID, and the 4th operand the prefix data |
| DEFPFX2 | Same as DEFPFX1, but with a 8 byte namespace token ID |
| DEFQ4N4L1 | Define a QName token. The first operand is a 1 byte name length, the second operand is a 1 byte type, followed by 4 byte token ID, 4 byte namespace token ID, and the local name. The values for type are: 0 (element QName) and 1 (attribute QName) |
| DEFQ4N4L2 | Same as DEFQ4N4L1 but with 4-byte token ID, 4-byte namespace token ID and 2-byte name length |
| DEFQ4N8L1 | Same as DEFQ4N4L1 but with a 4 byte token ID, 8-byte namespace token ID and 1 byte name length |
| DEFQ4N8L2 | Same as DEFQ4N4L1 but with a 4 byte token ID, 8 byte namespace token ID and 2 byte name length |
| DEFQ8N4L1 | Same as DEFQ4N4L1 but with a 8 byte token ID, 4 byte namespace token ID and 1 byte name length |
| DEFQ8N4L2 | Same as DEFQ4N4L1 but with a 8 byte token ID, 4 byte namespace token ID and 2 byte name length |
| DEFQ8N8L1 | Same as DEFQ4N4L1 but with a 8 byte token ID, 8 byte namespace token ID and 1 byte name length |
| DEFQ8N8L2 | Same as DEFQ4N4L1 but with a 8 byte token ID, 8 byte namespace token ID and 2 byte name length |

1.1.8 Property (Element/Attribute) Opcodes

| Operation | Description |
|---|---|
| PRPK1L1 | Element/Attribute with a single text node value. The following operands are present: 1-byte data length, 1-byte kidnum, data |
| PRPK1L2 | Same as PRPK1L1 but with 2-byte data length |
| PRPK2L1 | Same as PRPK1L1 but with 2-byte kidnum and 1-byte data length |
| PRPK2L2 | Same as PRPK1L1 but with 2-byte kidnum and 2-byte data length |
| PRPT1L1 | Element/Attribute with a single text node value. The following operands are present: 1-byte data length, 1-byte token ID, data |
| PRPT1L2 | Same as PRPT1L1 but with 2-byte data length |
| PRPT2L1 | Same as PRPT1L1 but with 2-byte token ID |
| PRPT2L2 | Same as PRPT2L1 but with 2-byte data length |
| PRPT4L1 | Same as PRPT2L1 but with 4-byte token ID |
| PRPT4L2 | Same as PRPT2L1 but with 4-byte token ID and 2-byte data length |
| PRPT8L1 | Same as PRPT2L1 but with 8-byte token ID and 1-byte data length |
| PRPT8L2 | Same as PRPT2L1 but with 8-byte token ID and 2-byte data length |
| PRPSTK1 | Start element/attribute, with 1 byte kidnum as the only operand |
| PRPSTK2 | Same as PRPSTK1 with 2 byte kidnum as the only operand |
| PRPSTT1 | Same as PRPSTK1 with 1 byte tokenID as the only operand |
| PRPSTT2 | Same as PRPSTK1 with 2 byte tokenID as the only operand |
| PRPSTT4 | Same as PRPSTK1 with 4 byte token ID as the only operand |
| PRPSTT8 | Same as PRPSTK1 with 8 byte token ID as the only operand |
| PRPSTK1F | Start element/attribute, with 1 byte kidnum as the 1st operand, and a 1 byte flag as the second operand. This opcode may not be used with flags requiring additional metadata. |
| PRPSTK2F | Same as PRPSTK1F with 2 byte kidnum as the first operand |
| PRPSTT1F | Same as PRPSTK1F with 1 byte token ID as the first operand |
| PRPSTT2F | Same as PRPSTK1F with 2 byte token ID as the first operand |
| PRPSTT4F | Same as PRPSTK1F with 4 byte token ID as the first operand |
| PRPSTT8F | Same as PRPSTK1F with 8 byte token ID as the first operand |
| PRPSTK1V | Start element/attribute, with a length byte as the 1st operand followed by 1 byte kidnum, a 1 byte flag, and a variable length metadata field (as indicated by the element flags). The metadata may not be longer than 64 bytes |
| PRPSTK2V | Same as PRPSTK1V with 2 byte kidnum as the first operand |
| PRPSTT1V | Same as PRPSTK1V with 1 byte token ID as the first operand |
| PRPSTT2V | Same as PRPSTK1V with 2 byte token ID as the first operand |

-continued

| Operation | Description |
|---|---|
| PRPSTT4V | Same as PRPSTK1V with 4 byte token ID as the first operand |
| PRPSTT8V | Same as PRPSTK1V with 8 byte token ID as the first operand |
| PRPSTT4BIF | Same as PRPSTT4F but has the element/attribute token ID followed by a 1 byte ID for the built-in type and a 1 byte flag |
| PRPSTT4Y4BIF | Same as PRPSTT4F but has the element/attribute token ID followed by a 4 byte token ID for the top level type QName, 1 byte ID for the built-in type and a 1 byte flag |
| PRPSTT4Y4F | Same as PRPSTT4F but has the element/attribute token ID followed by a 4 byte token ID for the top level type QName and a 1 byte flag. |
| PRPSTT4Y8F | Same as PRPSTT4F but has the element/attribute token ID followed by a 8 byte token ID for the top level type QName and a 1 byte flag. |
| PRPSTT4Y8BIF | Same as PRPSTT4F but has the element/attribute token ID followed by a 8 byte token ID for the top level type QName, 1 byte ID for the built-in type and a 1 byte flag. |
| PRPSTT8BIF | Same as PRPSTT8F but has the element/attribute token ID followed by a 1 byte ID for the built-in type and a 1 byte flag |
| PRPSTT8Y4BIF | Same as PRPSTT8F but has the element/attribute token ID followed by a 4 byte token ID for the top level type QName, 1 byte ID for the built-in type and a 1 byte flag |
| PRPSTT8Y4F | Same as PRPSTT8F but has the element/attribute token ID followed by a 4 byte token ID for the top level type QName and a 1 byte flag. |
| PRPSTT8Y8F | Same as PRPSTT8F but has the element/attribute token ID followed by a 8 byte token ID for the top level type QName and a 1 byte flag. |
| PRPSTT8Y8BIF | Same as PRPSTT8F but has the element/attribute token ID followed by a 8 byte token ID for the top level type QName, 1 byte ID for the built-in type and a 1 byte flag. |
| ELMSTART | Schema/sequential mode: start current element |
| ELMSTSSEQ | Schema/sequential mode: start current element whose children are also in schema-sequential mode. |

Undefined opcodes are reserved for future expansion

Element/Attribute Start Flags for Schema Based Encoding

Some of the element/attribute start opcodes contain flags, which are described below. Some of the flags indicate the usage of the space in the variable-width metadata segment. The fields referenced by the flags must appear in the order of the flags in the list below (if the appropriate flag indicates they are present)

| | |
|---|---|
| 0x01 | This element's children should be processed in schema-sequential mode |
| 0x02 | This element is not of the declared type i.e. an xsi:type attribute appears on explicitly on this element. The first 4 bytes of metadata are the type ID. |
| 0x04 | Implicit type information present. The first 4 bytes of metadata are the type ID. |
| 0x08 | Prefix ID present-two bytes of prefix ID are present after any type ID. |
| 0x10 | This element is nillable. |

Element/Attribute Start Flags for Non Schema Based Encoding

Some of the element/attribute start opcodes contain flags relating to type information even though non-schema based encoding might be in force. The following flags are used in conjunction with the PRPSTT {4/8} Y {4/8} B1F opcodes.

| | |
|---|---|
| 0x1 | This element is nillable. |
| 0x2 | This element does not have a named type (anonymous type). |
| 0x4 | Pefix ID present - two bytes of prefix ID are present after this flag. |

1.1.9 Miscellaneous Opcodes

| Operation | Description |
|---|---|
| ARRBEG | Begin array mode for the last element processed. If no element has been processed yet, this opcode is ignored. If array mode is already in force for this level of element nesting, the opcode is ignored. |
| ARREND | End of array |
| ENDPRP | End of element or attribute |
| NOSEQ | Not sequential. The immediately following property is not encoded using schema-sequential mode optimization. |
| NOP | No operation. Useful for filler when data values shrink |
| NOPARR | No operation, with a 4 byte operand indicating the total number of bytes to skip |
| NMSPC | Namespace node. The special xmlns:prefix = URL attribute declaration. The only operand is a 2 byte prefix ID |
| NSP4 | Namespace node. The first operand is prefix length and the second operand is 4 byte namespace ID followed by actual prefix value. |

-continued

| Operation | Description |
|---|---|
| | Normally NMSPC is preferred over NSP4 but to support piece-wise DML operations, when prefix ID is not available NSP4 can be used. |
| NSP8 | Same as NSP4 but the namespace ID is 8 bytes. |
| ARRSTK1V | Array Mode Start, with a length byte as the 1st operand followed by 1 byte kidnum, a 1 byte flag, and a variable length metadata field (as indicated by the element flags). The metadata may not be longer than 64 bytes. This indicates beginning of array mode with the metadata associated with this opcode as the context. |
| ARRSTK2V | Same as ARRSTK1V with 2 byte kidnum as the first operand. |
| ARRSTT4V | Same as ARRSTK1V with 4 byte token id as the first operand. |
| ARRSTT8V | Same as ARRSTK1V with 8 byte token id as the first operand. |
| PRTDATA | Partial data. 4 byte length operand followed by data. |
| PRTDATAT | Partial data. 4 byte length operand, 4 byte type-id followed by data |
| PRTTEXT | Partial Text, 4 byte length operand followed by text. |
| PRTCDATA | Partial Cdata, 4 byte length operand followed by Cdata value. |
| PRTP1 | Partial Processing Instruction. 4 byte length operand followed by partial P1 Value. |
| PRTCMT | Partial Comment. 4 byte length operand followed by partial comment. |
| SPACE1 | Ignorable whitespace Node with a 1 byte length. |
| SPACE2 | Ignorable whitespace Node with 2 byte length. |
| SPACE8 | Ignorable whitespace Node with 8 byte length. |

Encoding Notes

The opcode set is not perfectly symmetric—for example, some of the specialized opcodes providing for larger sizes of some fields require larger sizes for other fields. The most general way to encode elements is to use the variable width metadata opcodes—various size limitations may force encoding to use the generalized opcodes.

The optimizations defined in the schema (for sequential & array modes) are at the discretion of the encoding engine to use—for example, just because the schema specifies that sequential mode is allowable, the instance document may not use that optimization.

The data within an attribute or element can itself be a list of atomic values. This is encoded as a sequence of DAT* opcodes within PRPST* and ENDOP opcodes.

Large node values can be encoded using a sequence of PRTDATA opcodes ending with one of the DAT* opcodes. This scheme avoids the need to specify the total length of the node data at the start of the opcode, thus improving streamability. Only string and binary encoded data can be split up using PRTDATA* opcodes. As previously discussed, the first two bits of first length byte indicate the encoding type.

Schema Scoping

The SCHSST opcode is used to define the scope of property IDs and type IDs appearing after it in the CSX stream. The scope is managed in a stack fashion and is in effect until the corresponding SCHSEND opcode which reverts to the previously defined schema scope.

1.1.10 Whitespace Opcodes: SPACE1, SPACE2 and SPACE8

SPACEx opcodes are used to encode ignoreable whitespace such as whitespace present between end tag of an element and begin tag of next. SPACE1, SPACE2 and SPACE8 opcodes take one operand which is either 1, 2 or 8 bytes in length. The 3 MS bits in the length byte(s) are used to denote the type of whitespace—(000—space, 001—tab, 010—linefeed, 011—carriage return) and the rest of the length operand indicates the occurence count of the whitespace.

The encoder may optionally preserve the ignoreable whitespace. If it does, it may set the doc flag bit 5 described under DOC opcode. An example usage could be that, this bit may be consulted at the time of printing the document to decide whether to do pretty printing or print only the space encoded in the document using SPACEx opcodes.

What is claimed is:

1. A method for encoding insignificant white space of eXtensible Markup Language (XML) data, the method comprising:
    identifying an occurrence of insignificant white space in the XML data;
    generating encoded data to represent the occurrence of insignificant white space, wherein the encoded data includes one or more opcodes and one or more corresponding operands, wherein the encoded data does not include the insignificant white space whose occurrence the encoded data represents;
    reconstructing a version of the XML data that includes the occurrence of the insignificant white space based on (a) the encoded data, and (b) information that represents the XML data without the insignificant white space; and
    wherein the method is performed by one or more computing devices.

2. The method of claim 1 further comprising, after generating the one or more opcodes and one or more corresponding operands, storing the one or more opcodes and one or more corresponding operands in a database, wherein the database also stores the information that represents the XML data without the insignificant white space.

3. The method of claim 1 wherein the information that represents the XML data is binary XML.

4. The method of claim 3 wherein the one or more opcodes and one or more corresponding operands are stored as part of the binary XML that represents the XML data.

5. The method of claim 1 wherein the step of reconstructing a version of the XML data includes decoding the binary XML with a decoder that:
    generates tokens based on replacement values contained in the binary XML; and
    generates insignificant white space based on white space opcodes and white space operands contained in the binary XML.

6. The method of claim 1 wherein the one or more opcodes includes an opcode that indicates a size of a corresponding operand that follows the one or more opcodes.

7. The method of claim 1 wherein the encoded data includes a type portion that indicates what type of whitespace is contained in said occurrence.

8. The method of claim 7 wherein the type portion indicates a particular type of whitespace character.

9. The method of claim 7 wherein the type portion indicates a particular type of whitespace pattern, wherein the whitespace pattern is a pattern of two or more whitespace characters, wherein the two or more whitespace characters include two or more types of whitespace characters.

10. The method of claim 1 wherein the one or more operands includes an operand that includes a count portion that indicates how many times a particular white space character is repeated in said occurrence of white space.

11. The method of claim 1 wherein the one or more operands includes an operand that includes a count portion that indicates how many times a particular white space pattern is repeated in said occurrence of white space.

12. The method of claim 1 further comprising storing, with the information that represents the XML data, a flag that indicates whether insignificant white space is included in the information that represents the XML data.

13. A computer-readable storage that stores instructions which, when executed by one or more processors, cause performance of:
   identifying an occurrence of insignificant white space in the XML data;
   generating encoded data to represent the occurrence of insignificant white space, wherein the encoded data includes one or more opcodes and one or more corresponding operands, wherein the encoded data does not include the insignificant white space whose occurrence the encoded data represents;
   reconstructing a version of the XML data that includes the occurrence of the insignificant white space based on (a) the encoded data, and (b) information that represents the XML data without the insignificant white space.

14. The computer-readable storage of claim 13 further comprising instructions for, after generating the one or more opcodes and one or more corresponding operands, storing the one or more opcodes and one or more corresponding operands in a database, wherein the database also stores the information that represents the XML data without the insignificant white space.

15. The computer-readable storage of claim 13 wherein the information that represents the XML data is binary XML.

16. The computer-readable storage of claim 15 wherein the one or more opcodes and one or more corresponding operands are stored as part of the binary XML that represents the XML data.

17. The computer-readable storage of claim 13 wherein the step of reconstructing a version of the XML data includes decoding the binary XML with a decoder that:
   generates tokens based on replacement values contained in the binary XML; and
   generates insignificant white space based on white space opcodes and white space operands contained in the binary XML.

18. The computer-readable storage of claim 13 wherein the one or more opcodes includes an opcode that indicates a size of a corresponding operand that follows the one or more opcodes.

19. The computer-readable storage of claim 13 wherein the encoded data includes a type portion that indicates what type of whitespace is contained in said occurrence.

20. The computer-readable storage of claim 19 wherein the type portion indicates a particular type of whitespace character.

21. The computer-readable storage of claim 19 wherein the type portion indicates a particular type of whitespace pattern, wherein the whitespace pattern is a pattern of two or more whitespace characters, wherein the two or more whitespace characters include two or more types of whitespace characters.

22. The computer-readable storage of claim 13 wherein the one or more operands includes an operand that includes a count portion that indicates how many times a particular white space character is repeated in said occurrence of white space.

23. The computer-readable storage of claim 13 wherein the one or more operands includes an operand that includes a count portion that indicates how many times a particular white space pattern is repeated in said occurrence of white space.

24. The computer-readable storage of claim 13 further comprising instructions for storing, with the information that represents the XML data, a flag that indicates whether insignificant white space is included in the information that represents the XML data.

* * * * *

UNITED STATES PATENT AND TRADEMARK OFFICE
CERTIFICATE OF CORRECTION

PATENT NO. : 7,627,566 B2  Page 1 of 2
APPLICATION NO. : 11/707730
DATED : December 1, 2009
INVENTOR(S) : Balasubramanyam Sthanikam et al.

It is certified that error appears in the above-identified patent and that said Letters Patent is hereby corrected as shown below:

On the title page, item [56];

On page 2, in column 1, under "Other Publications", line 3, delete "Giradot," and insert -- Girardot, --, therefor.

On page 2, in column 2, under "Other Publications", line 14, delete "queriable" and insert -- queryable --, therefor.

In column 3, line 8, delete "preversing" and insert -- preserving --, therefor.

In column 5, line 15, delete "100000011" and insert -- 00000011 --, therefor.

In column 5, line 35, delete "0100000001." and insert -- 010000001. --, therefor.

In column 5, line 64, after "01000001" insert -- . --.

In column 9, line 49, after "following" insert -- : --.

In column 13-14, line 4, delete "Operand" and insert -- operand --, therefor.

In column 15-16, line 4, delete "PRPSTT4BIF" and insert -- PRPSTT4B1F --, therefor.

In column 15-16, line 6, delete "PRPSTT4Y4BIF" and insert -- PRPSTT4Y4B1F --, therefor.

In column 15-16, line 13, delete "PRPSTT4Y8BIF" and insert -- PRPSTT4Y8B1F --, therefor.

In column 15-16, line 16, delete "PRPSTT8BIF" and insert -- PRPSTT8B1F --, therefor.

In column 15-16, line 18, delete "PRPSTT8Y4BIF" and insert -- PRPSTT8Y4B1F --, therefor.

In column 15-16, line 25, delete "PRPSTT8Y8BIF" and insert -- PRPSTT8Y8B1F --, therefor.

Signed and Sealed this

Fourteenth Day of September, 2010

David J. Kappos
*Director of the United States Patent and Trademark Office*

CERTIFICATE OF CORRECTION (continued)
U.S. Pat. No. 7,627,566 B2

In column 15, line 40, after "present)" insert -- . --.

In column 16, line 48, delete "Pefix" and insert -- Prefix --, therefor.

In column 17, line 62, delete "occurence" and insert -- occurrence --, therefor.

UNITED STATES PATENT AND TRADEMARK OFFICE
CERTIFICATE OF CORRECTION

| | | |
|---|---|---|
| PATENT NO. | : 7,627,566 B2 | Page 1 of 1 |
| APPLICATION NO. | : 11/707730 | |
| DATED | : December 1, 2009 | |
| INVENTOR(S) | : Sthanikam et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 318 days.

Signed and Sealed this

Second Day of November, 2010

David J. Kappos
*Director of the United States Patent and Trademark Office*